United States Patent
Alexander (10) Patent No.: US 7,676,746 B1
(45) Date of Patent: Mar. 9, 2010

(54) SYSTEM AND METHOD FOR IN-CONTEXT AUTHORING OF ALTERNATE CONTENT FOR NON-TEXTUAL OBJECTS

(76) Inventor: Vlad Alexander, 515 Chaplin Crescent, Apt. 817, Toronto, Ontario (CA) M5N 2N1

( * ) Notice: Subject to any disclaimer, the term of this patent is extended or adjusted under 35 U.S.C. 154(b) by 1061 days.

(21) Appl. No.: 11/345,217

(22) Filed: Feb. 1, 2006

Related U.S. Application Data (60) Provisional application No. 60/742,640, filed on Dec. 6, 2005.

(51) Int. Cl.
*G06N 3/00* (2006.01)
(52) U.S. Cl. .................................................. 715/257
(58) Field of Classification Search ................. 715/234, 715/243, 254, 255
See application file for complete search history.

(56) References Cited

U.S. PATENT DOCUMENTS

| | | | |
|---|---|---|---|
| 6,558,431 | B1 | 5/2003 | Lynch et al. |
| 6,948,937 | B2 | 9/2005 | Tretiakoff et al. |
| 2002/0178007 | A1* | 11/2002 | Slotznick et al. ......... 704/270.1 |
| 2005/0160065 | A1* | 7/2005 | Seeman .......................... 707/1 |
| 2007/0112851 | A1* | 5/2007 | Tomic et al. ............. 707/104.1 |

OTHER PUBLICATIONS

Macromedia, "Dreamweaver 8 Accessibility Overview," http://www.macromedia.com/resources/accessibility/dw8/overview.html.
World Wide Web Consortium, "Implementation Techniques for Authoring Tool Accessibility Guidelines 2.0," http://www.w3.org/WAI/AU/2005/11/tech1.html.
WebAIM, "Microsoft Word Accessibility Techniques," http://www.webaim.org/techniques/word/ - provide.

* cited by examiner

*Primary Examiner*—Kyle R Stork
(74) *Attorney, Agent, or Firm*—Maier & Maier, PLLC

(57) ABSTRACT

A system and method for enabling in-context authoring of alternate content for one or more non-textual objects is presented. An electronic document containing content that includes at least one non-textual object is accessed. In-context editing of alternate content corresponding to the non-textual object is facilitated. The alternate content is presented contextually co-located with the content located proximate to a physical placement of the non-textual object. Editing operations are performed on the alternate content in response to editing commands. A system and method for enabling in-context authoring of alternate content for one or more non-textual objects is also presented. An electronic document containing content is accessed. In-context editing of alternate content corresponding to a non-textual object is facilitated. A segment of the content is selected. The non-textual object is obtained from a data source and substituted for the content segment, which is stored as the alternate content for the non-textual object.

28 Claims, 9 Drawing Sheets

```
<p>To save the document, press the          ←— 132
    <img
        src="images/icon4.gif"   ←— 134
        alt="Save button"        ←— 135
    />
on the toolbar.</p>   ←— 133
```

(131 brackets the <img> block; 130 labels the whole figure)

SYSTEM AND METHOD FOR IN-CONTEXT AUTHORING OF ALTERNATE CONTENT FOR NON-TEXTUAL OBJECTS

CROSS-REFERENCE TO RELATED APPLICATION

This non-provisional patent application claims priority under 35 USC §119(e) to U.S. provisional patent application Ser. No. 60/742,640, filed Dec. 6, 2005, the disclosure of which is incorporated by reference.

FIELD OF THE INVENTION

The invention relates in general to authoring environments and, in particular, to a system and method for in-context authoring of alternate content for non-textual objects.

BACKGROUND OF THE INVENTION

Graphics- and multimedia-enabled computer systems and full-featured content authoring environments facilitate the creation and publication of documents that can contain non-textual objects. Non-textual objects include graphics, icons, pictures, sounds, and other forms of visual, audible, and tactile content and can be provided in lieu of or to complement text.

Non-textual objects, however, cannot be processed by assistive technologies, such as used by individuals with physical or cognitive difficulties or impairments. Assistive technologies are generally designed to process text only. Other widely-used technologies are also unable to process non-textual objects, such as non-graphical, text-only Web browsers, graphical Web browsers configured to not render non-textual objects, popular search engines, and numerous character-based legacy applications. In situations in which a non-textual object cannot be accessed or processed, alternate content for the non-textual object can serve as a substitute for the non-textual object. For example, assistive technologies present alternate text in place of a graphical image for visually impaired persons.

In the United States, recent amendments to the Rehabilitation Act of 1973 require individuals with disabilities who are federal employees or members of the public to have access to and use of information and data in a manner comparable to access and use by individuals without disabilities. This requirement has been interpreted to embrace information presented by Web-based applications, on-line content, and similar forms of stored data, including the provisioning of alternate content for non-textual objects. Additionally, the Web Content Accessibility Guidelines, published by the Worldwide Web Consortium, recommend always providing textual alternatives for non-textual objects.

To not distort the meaning of a document, alternate content for non-textual objects should be composed in the context of the content that is proximate to the non-textual objects. For example, if a non-textual object is located in the middle of a sentence, assistive technologies or text-only applications will "read," that is, substitute, the alternate content for that non-textual object as if the alternate content were part of the sentence. Alternate content should be composed in-context to ensure that such substitutions, as well as other uses of alternate content, remain consistent with the meaning of the document and surrounding proximate content. Though content authoring environments generally offer composition features that can accommodate generating alternate content for non-textual objects, these environments present alternate content in isolation and out of context. For example, the input areas for alternate content in Microsoft Word, licensed by Microsoft Corporation, Redmond, Wash., and Dreamweaver, licensed by Macromedia, San Francisco, Calif., do not present content that is proximate to the non-textual object in the document. Authoring correct and appropriate alternate content is therefore difficult when alternate content is displaced from proximate content.

Proximate content is determined relative to the physical placement of a non-textual object in a document. Nevertheless, authoring environments are oriented towards only the logical view of a document. This limitation presents challenges to correcting and authoring appropriate alternate content when formatting is applied to non-textual objects, as the physical and logical placements of a non-textual object can differ. For instance, the logical placement of a floating image, that is, where text wraps around an image, is generally not the same as the physical image placement.

Authoring tools also restrict the compositional features available for editing alternate content. Extended features, such as spell checking, grammar checking, search, replace and thesaurus access, are unavailable when composing and editing alternate content.

Therefore, there is a need for an approach to supplement content authoring environments with an intuitive interface for flexibly composing, in-context, alternate content for non-textual objects. Preferably, such an approach would present alternate content contextually co-located with the content, such as textual content, that is located proximate to the physical placement of the non-textual objects and accommodate multiple authoring environment layout schemes.

SUMMARY OF THE INVENTION

One embodiment provides a system and method for enabling in-context authoring of alternate content for one or more non-textual objects. An electronic document is accessed. The electronic document contains content that includes at least one non-textual object. In-context editing of alternate content corresponding to the at least one non-textual object is facilitated. The alternate content is presented contextually co-located with the content located proximate to a physical placement of the at least one non-textual object. Editing operations are performed on the alternate content in response to editing commands.

A further embodiment provides a system and method for enabling in-context authoring of alternate content for one or more non-textual objects. An electronic document is accessed and contains content. In-context editing of alternate content corresponding to a non-textual object is facilitated. A segment of at least part of the content is selected and the non-textual object from a data source is obtained. The non-textual object is substituted for the content segment. The content segment is stored as the alternate content for the non-textual object.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Authoring Environment

Figure 1:
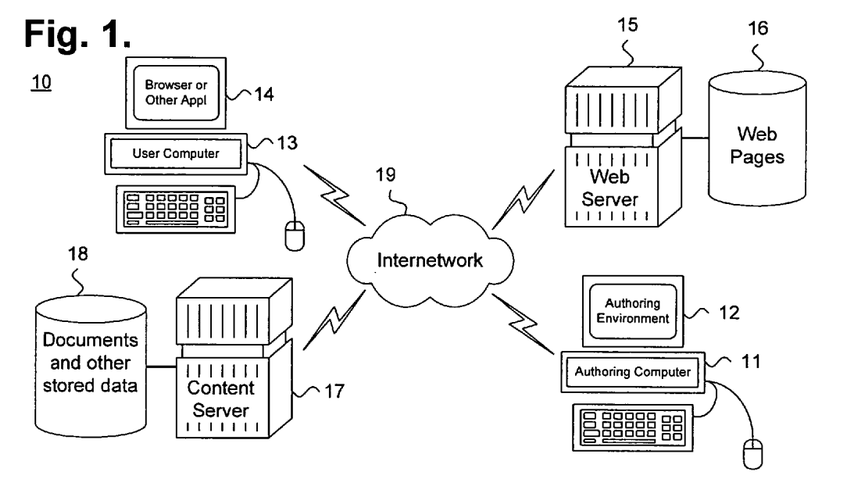
FIG. 1 is functional block diagram 10 showing, by way of example, an authoring environment for documents containing non-textual objects.

FIG. 1 is a functional block diagram 10 showing, by way of example, an authoring environment for documents containing non-textual objects. Content that can include both text and non-textual objects is composed on an authoring computer 11 through use of an authoring environment 12. In one embodiment, the content is written in a tag-delimited document language, such as the Hypertext Markup Language (HTML), Extensible HTML (XHTML), Extensible Markup Language (XML), and OpenDocument, or in a proprietary document format, such as used by Microsoft Word or the Portable Document Format (PDF), licensed by Adobe Systems, Inc., San Jose, Calif. Other tag-delimited document languages and proprietary document formats are possible.

The authoring environment 12 offers features for composing and editing alternate content in lieu of non-textual objects. The authoring environment 12 preferably provides a visual user interface for content composition using a conventional keyboard, display, and pointing device, such as a mouse. In addition, the authoring environment 12 can also provide a non-visual user interface, such as an audio interface or tactile interface or a programmatic application programming interface (API), which accommodate alternate means of user or application interaction. The operations performed on alternate content for non-textual objects generally must comply with the document language, as well as the functionality provided for authoring alternate content in the selected format, which can include limits on the use of white space characters, such as carriage returns or linefeeds; media-specific formatting, such as boldface, italics, underlining, and voice synthesis; hyperlinks; and other semantic constructs. Authoring environments 12 include, for example, Microsoft Word and Dreamweaver. Other authoring environments are possible, such as provided through word processing and Web page composition applications.

The content includes Web pages 16, as well as documents and other stored data 18. Content can be created for use on the authoring computer 11, but can also be distributed in electronic form over an internetwork 19, such as the Internet, or other wired or wireless infrastructure. Web pages 16, for instance, can be published by a Web server 15 and documents and other stored data 18 can be published by a content server 17. Other types of content publication or dissemination services are possible.

Content is generally viewed in electronic form, although viewing as hard copy, that is, printed, media is also possible. Typically, a viewer accesses the content through a user computer 13 that executes a Web browser or other application 14. The content is presented with the display, rendition, or presentation of text and non-textual objects formatted by the Web browser or other application 14 in a layout based on the viewing environment available.

Preferably, the Web server 15 and content server 17 are server-grade computing platforms and the authoring computer 11 and user computer 13 are general-purpose computing workstations, such as a personal desktop or notebook computer. The user computer 13 could also be a graphics- or multimedia-capable device, such as a personal data assistant, cellular telephone, or other device or personal appliance that provides access to content as a primary or supplemental feature. The authoring computer 11, user computer 13, Web server 15, and content server 17 are programmable computing devices that execute software programs and include components conventionally found in computing devices, such as, for example, a central processing unit, memory, network interface, persistent storage, and components for interconnection.

Prior Art Authoring Environment

Figure 2:
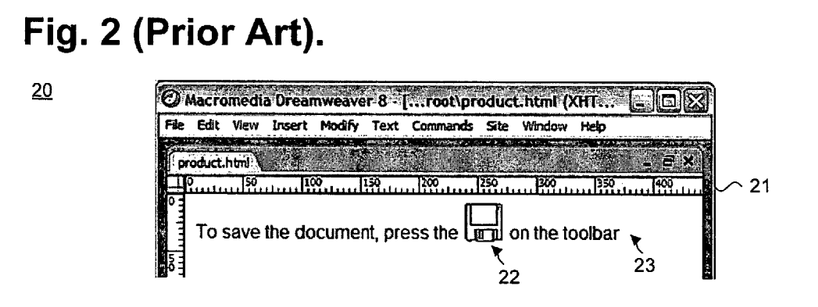
FIG. 2 is a partial screen shot showing, by way of example, a prior art authoring environment.

FIG. 2 is a partial screen shot 20 showing, by way of example, a prior art authoring environment 21. The environment provides a main view that is used for content composition through a What-You-See-Is-What-You-Get ("WYSIWYG") interface. A graphical representation of a non-textual object 22 is presented contextually within a document excerpt 23. The alternate content for the non-textual object 22, however, is hidden from view.

Figure 3:
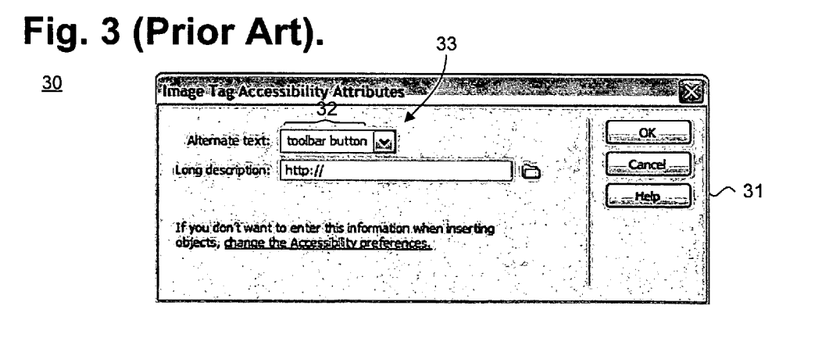
FIG. 3 is a screen image showing, by way of example, a prior art pop-up window generated by the authoring environment of FIG. 2.

FIG. 3 is a screen image 30 showing, by way of example, a prior art pop-up window 31 generated by the authoring environment of FIG. 2. The alternate content 32, such as text, is displayed in a view that is separate from the view providing the document being composed. The alternate content 32 is out-of-context relative to the document excerpt 23 (shown in FIG. 2) and is presented in a completely separate interface located in a pop-up window. Other types of separate interfaces, such as dialog boxes, panels, and balloons are possible. The pop-up window 31 contains a text input control 33 for authoring the alternate content 32. For instance, the alternate content "toolbar button" is entered in place of a floppy diskette icon. Depending on the context of the non-textual object in the document excerpt, alternate content authored in this manner, that is, out-of-context, may, or may not, represent the correct meaning or function represented by the non-textual object 22.

Alternate Content Display Environment

Figure 4:
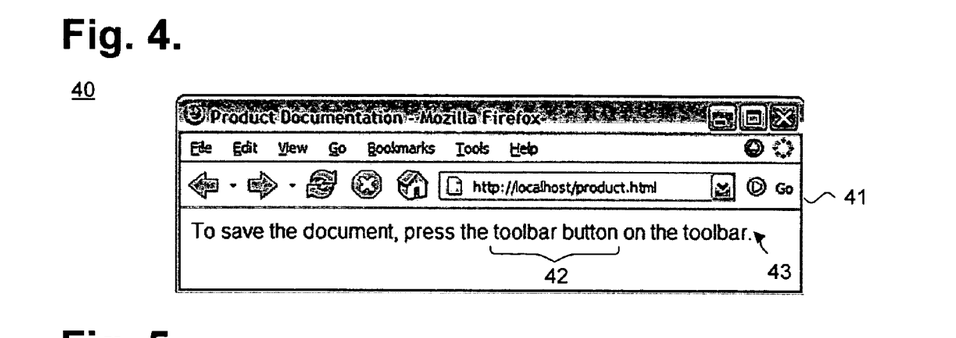
FIG. 4 is a partial screen shot showing, by way of example, a graphical Web browser displaying alternate content in lieu of a non-textual object.

FIG. 4 is a partial screen shot 40 showing, by way of example, a graphical Web browser 41. The graphical Web browser 41 has either been configured to not render non-textual objects or is unable to render the non-textual object 22. Accordingly, alternate content 32 is displayed 42 in lieu of the non-textual object 22, at the physical location within the document 43 of the non-textual object 22. When viewed in this context, the alternate content "toolbar button" 42 that was authored out-of-context 32 inappropriately shows the meaning of the corresponding non-textual object 22, which is a floppy diskette icon, as "toolbar button" and, as a result, negatively affects the comprehension of the document.

Figure 5:
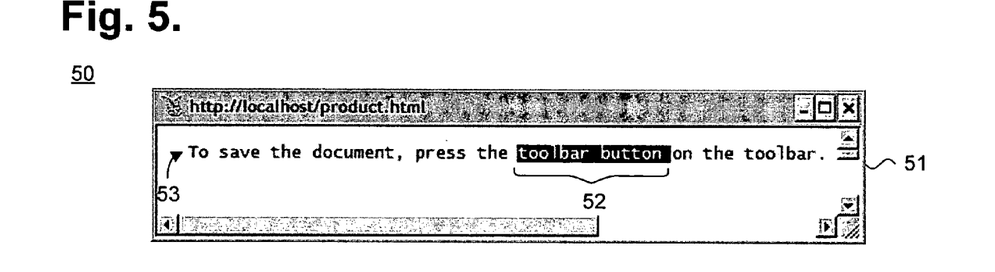
FIG. 5 is a partial screen shot showing, by way of example, a textual Web browser displaying alternate content in lieu of a non-textual object.

FIG. 5 is a partial screen shot 50 showing, by way of example, a textual Web browser 51 that is unable to display non-textual objects. Alternate content 32 is displayed 52 in lieu of a non-textual object 22. When viewed in this context, the alternate content "toolbar button" 52, which was authored out-of-context 32, incorrectly shows the meaning of the corresponding non-textual object 22, which is a floppy diskette icon, as "toolbar button" and, as a result, negatively affects the comprehension of the document.

In-Context Alternate Content Authoring Interface

Figure 6:
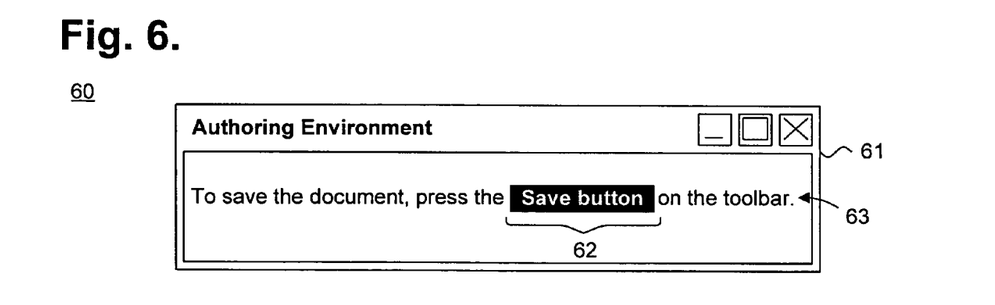
FIG. 6 is a screen shot showing, by way of example, an authoring environment providing in-context authoring of alternate content in-line within a document, in accordance with one embodiment.

FIG. 6 is a screen shot 60 showing, by way of example, an authoring environment 61 providing in-context authoring of alternate content in-line within a document 63, in accordance with one embodiment. The authoring environment 61 presents the alternate content 62 in-line within a document 63. The alternate content 62 is contextually co-located with proximately-located content. The content author can navigate into the alternate content area and directly edit the alternate content 62 as though an integral part of the document 63. Depending upon the document language used to encode the document 63, the in-line representation of the alternate content 62 can be in plain text or marked-up with constructs of the document language, such as hyperlinks, semantic markups, or formatting instructions. Other types of constructs are possible. The authoring environment 61 can also restrict available constructs that can be applied to alternate content through application settings.

When presented in-context by the authoring environment 61, the area occupied by the alternate content 62 can be specifically identified or emphasized, such as by the use of plain text, background color, background pattern, foreground color, foreground pattern, font type, font size, border, outline, graphical markers, images, audio signals, tactile signals, and programmatic objects. Other forms of alternate content identifications or emphasis are possible.

Figure 7:
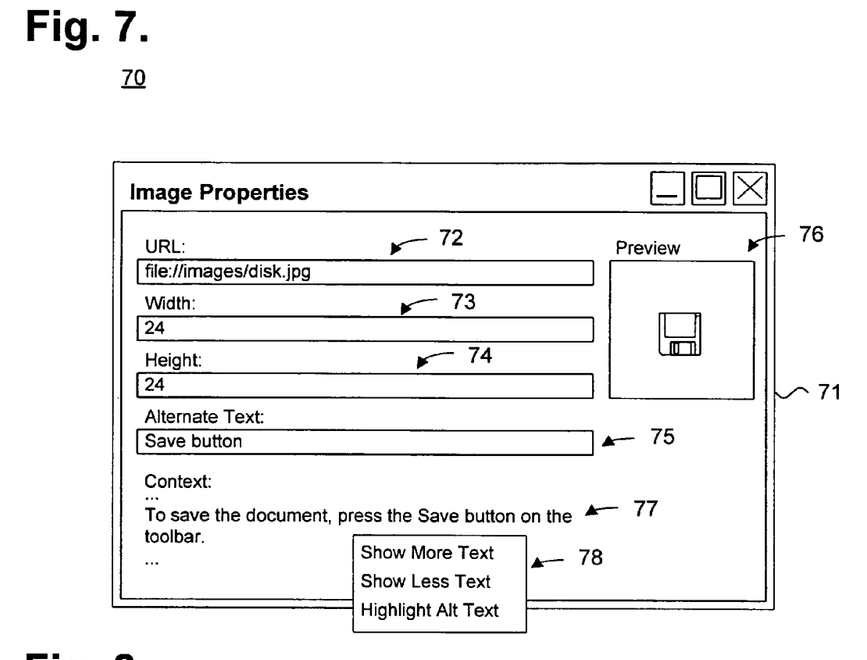
FIG. 7 is a screen shot showing, by way of example, an authoring environment providing a separate in-context alternate content authoring interface, in accordance with a further embodiment.

FIG. 7 is a screen shot 70 showing, by way of example, an authoring environment providing a separate in-context alternate content authoring interface 71, in accordance with a further embodiment. A common dialog box for editing non-textual object properties 71 contains user interface controls for capturing or displaying the properties of a non-textual object, which can include URL 72, Width 73, Height 74, Alternate Text 75, and Preview 76. Other non-textual object properties are possible.

The alternate content is entered via the Alternate Text control 75. The interface 71 also includes a control 77 to contextually display the alternate content in the physical position of the non-textual object within the document, along with at least some of the available content that precedes and that follows the physical placement of the non-textual object. The amount of content displayed proximate to the alternate content, that is, before and after, can be configured globally via application settings or individually via user interface controls, such as a pop-up menu 78. Additional content omitted before or after the alternate content in the control 77 can also be abbreviated by ellipses or other symbols. Other non-textual objects located before or after the alternate content for the current non-textual object can be represented by their alternate content.

As text is updated in the Alternate Text field 75, changes are reflected in the control 77. The control 77 can be a read-only label control, a document preview control, such as an embedded Web browser, or an authoring interface. The control 77 can have scroll bars and other navigational features. In addition, alternate content within the control 77 can be formatted to be visually distinct from the content that precedes and follows. The formatting can be configured globally via application settings or individually via user interface controls, such as a pop-up menu 78. The content that precedes and follows the alternate content can optionally display the formatting applied in the document.

Figure 8:
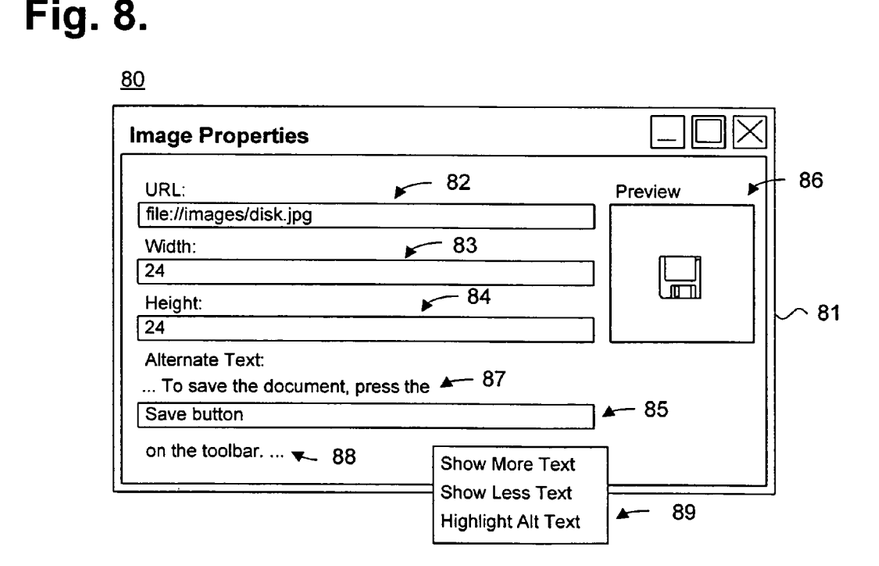
FIG. 8 is a screen shot showing, by way of example, an authoring environment providing a separate in-context alternate content authoring interface, in accordance with a further embodiment.

FIG. 8 is a screen shot 80 showing, by way of example, an authoring environment providing a separate in-context alternate content authoring interface 81, in accordance with a further embodiment. A common dialog box for editing non-textual object properties 81 contains user interface controls for capturing or displaying the properties of a non-textual object, which can include URL 82, Width 83, Height 84, Alternate Text 85, and Preview 86. Other non-textual object properties are possible. The interface 81 presents the alternate content entered through the Alternate Text control 85 in-context along with at least some of the available content that precedes 87 and follows 88 the physical placement of the non-textual object in the document. The amount of proximate content displayed can be configured globally via application settings or individually via user interface controls, such as a pop-up menu 89. Additionally, content omitted before or after the alternate content can also be abbreviated by ellipses or other symbols. Other non-textual objects located before or after the alternate content for the current non-textual object can be represented by their alternate content. The contextual presentation area 87, 88 can be a read-only label control; a document preview control, such as an embedded Web browser; or an authoring interface and can have scroll bars and other navigational features. Content that precedes and follows the alternate content can optionally display the formatting applied in the document.

Figure 9:
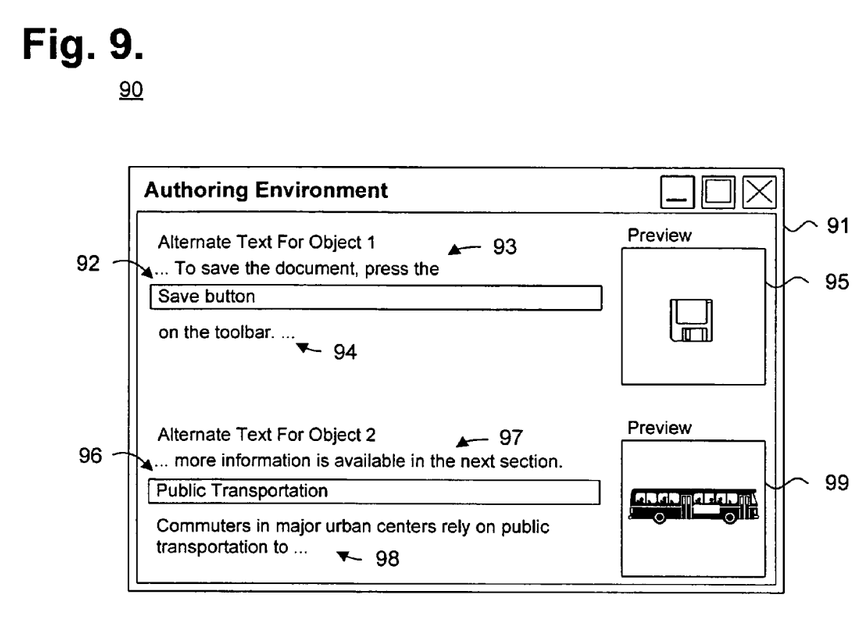
FIG. 9 is a screen shot showing, by way of example, an authoring environment providing a separate in-context alternate content authoring interface for multiple alternate content, in accordance with a further embodiment.

FIG. 9 is a screen shot 90 showing, by way of example, an authoring environment providing a separate in-context alternate content authoring interface for multiple alternate content 91, in accordance with a further embodiment. A common dialog box for editing non-textual object properties 91 contains user interface controls for capturing or displaying the properties of one or more non-textual objects, which can include alternate content 92, 96 and Preview 95, 99. Additional properties of the one or more non-textual objects can be displayed. The interface 91 presents the alternate content in-context in the physical position of each non-textual object in its respective document, with at least some of the content that precedes 93, 97 and follows 94, 98 the physical placement of each non-textual object. The amount of proximate content displayed can be configured globally via application settings or individually via user interface controls. Content omitted before and after the alternate content can be abbreviated by ellipses or other symbols. Other non-textual objects located proximate to the alternate content can be represented by their respective alternate content. The contextual presentation can be a read-only label control; a document preview control, such as an embedded Web browser; or an authoring interface and can have scroll bars and other navigational features. The content that precedes and follows the alternate content can optionally display the formatting applied in their respective documents.

Figure 10:
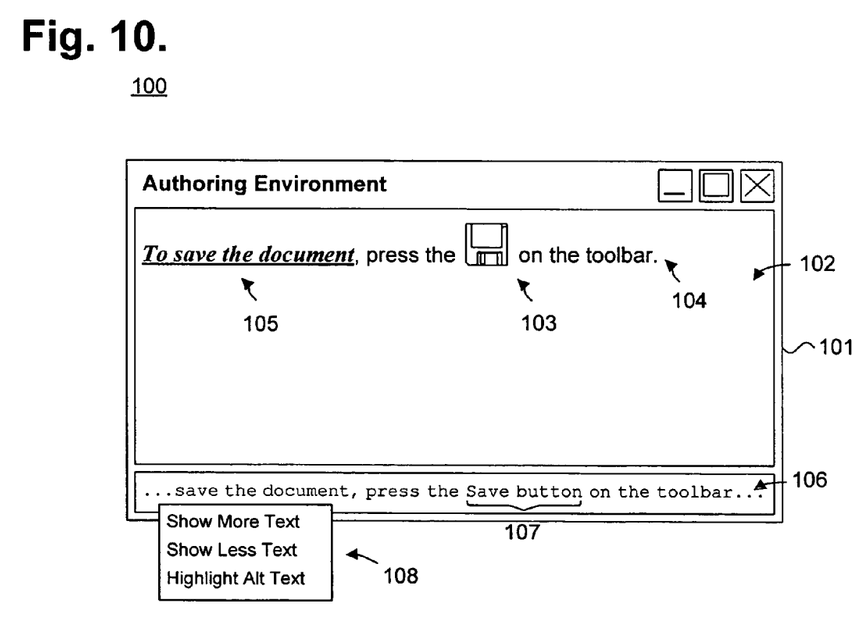
FIG. 10 is a screen shot showing, by way of example, an authoring environment contextually presenting alternate content in a separate panel, in accordance with a further embodiment.

FIG. 10 is a screen shot 100 showing, by way of example, an authoring environment contextually presenting alternate content in a separate panel, in accordance with a further embodiment. An authoring environment 101 provides a main view 102 that is used for content composition and displays a non-textual object 103 in a document excerpt 104. Alternate content for one or more non-textual objects is authored in a separate interface, but is presented in-context 107 in the authoring environment 101 in a panel 106, with at least some of the available content that precedes and follows the physical placement of the non-textual object in the document excerpt 104. Other forms of separate interface, including areas, windows, and balloons are possible. As alternate content is updated in the separate interface, changes are reflected in the panel 106. The amount of content displayed before and after the alternate content can be configured globally via application settings or individually via user interface controls, such as a pop-up menu 108. Proximate content presented in the panel 106 can optionally display formatting applied to the content in the document 105. Content omitted before and after the alternate content can be abbreviated by ellipses or other symbols. Other non-textual objects located before or after the alternate content for the current non-textual object can be represented by their alternate content. The panel 106 can have scroll bars and other navigational features. Alternate content 107 can be formatted to be visually distinct from the content that precedes and follows. The formatting can be configured globally via application settings or individually via user interface controls, such as a pop-up menu 108.

Figure 11:
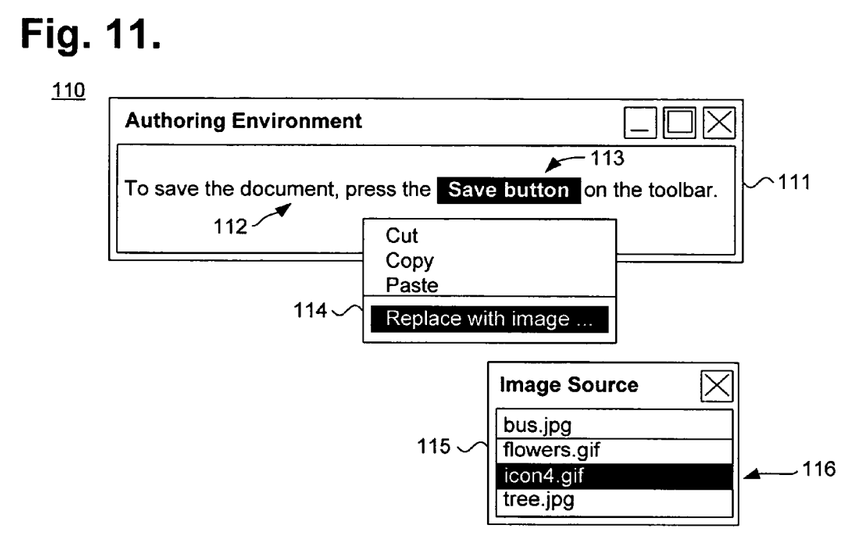
FIG. 11 is a screen shot showing, by way of example, an authoring environment providing in-context authoring of alternate content, in accordance with a further embodiment.

FIG. 11 is a screen shot 110 showing, by way of example, an authoring environment providing in-context authoring of alternate content, in accordance with a further embodiment. An authoring environment 111 presents a document excerpt 112. In response to user input, content can be selected 113. In response to further user input, a context menu 114 can be presented, including an option "Replace with image . . . " that, when selected, causes a selection of non-textual objects 115 to be presented. A selected non-textual object 116 replaces the selected content 113 and the selected content 113 is stored as alternate content for the selected non-textual object 116.

Figure 12:
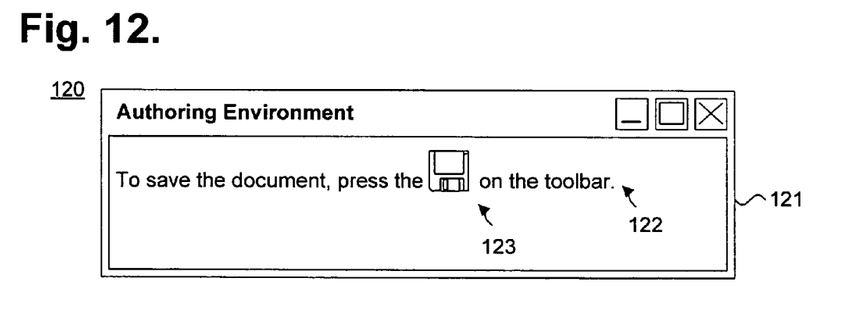
FIG. 12 is a screen shot showing, by way of example, modifications to the authoring environment of FIG. 11 as a result of user interaction.

FIG. 12 is a screen shot 120 showing, by way of example, modifications to the authoring environment of FIG. 11 as a result of user interaction. An authoring environment 121 presents a document excerpt 122. Non-textual object 123 is presented in lieu of the previously selected content 113.

Figure 13:
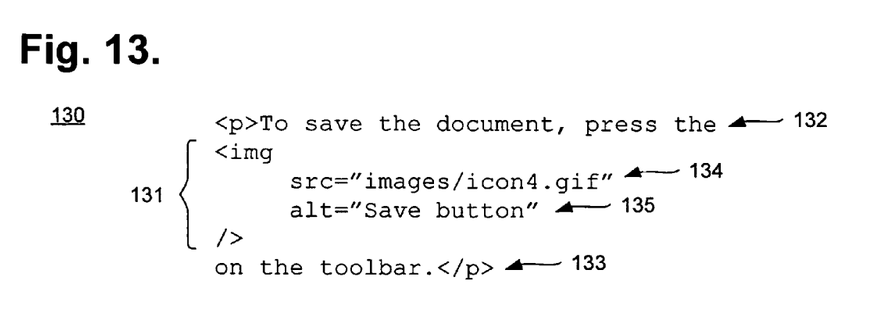
FIG. 13 is a screen shot showing, by way of example, modifications to the document language in the authoring environment of FIG. 11.

FIG. 13 is a screen shot 130 showing, by way of example, modifications to the document language in the authoring environment of FIG. 11. Using XHTML as an example, the document language includes a definition of a non-textual object 131, and content preceding 132 and following 133 the placement of the non-textual object within the document excerpt. The definition of a non-textual object includes the source 134 of the non-textual object and alternate content 135 for the non-textual object, such as the content "Save button."

Alternate Content Authoring Tools

Figure 14:
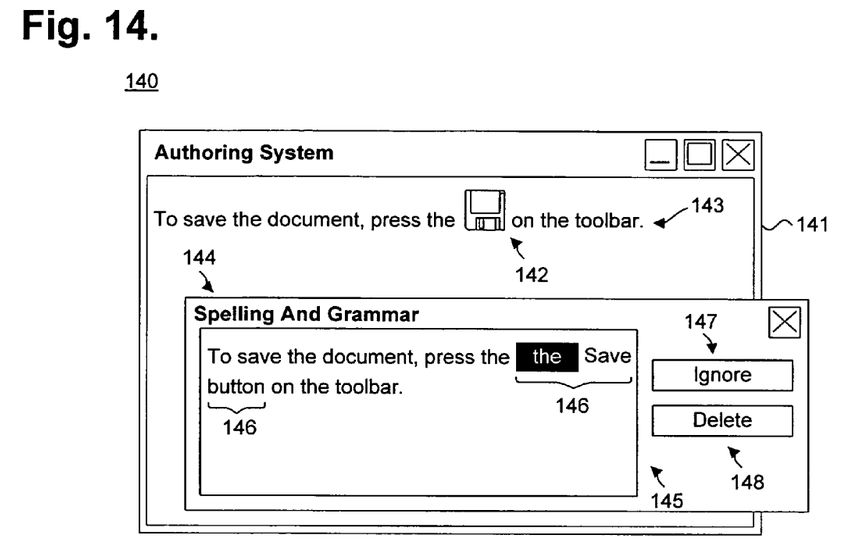
FIG. 14 is a screen shot showing, by way of example, an authoring environment providing spell and grammar checking authoring tools for use with alternate content, in accordance with a further embodiment.

FIG. 14 is a screen shot 140 showing, by way of example, an authoring environment 141 providing spell and grammar checking authoring tools 144 for use with alternate content, in accordance with a further embodiment. A document excerpt 143 includes a non-textual object 142, such as an icon of a diskette. A spelling and grammar interface 144 contextually displays 145 alternate content 146 for the non-textual object 142, along with at least some of the available content that precedes and follows the physical placement of the non-textual object in the document excerpt 143. The alternate content is contextually co-located with proximately-located content. The alternate content 146 consisting of the text "the Save button" introduces a grammatical error in the context of the document excerpt 143, due to two consecutive instances of the word "the." A grammatical error of this type could easily be overlooked when the alternate content 146 is viewed out-of-context relative to the non-textual object 142 that the alternate content replaces. Spelling and grammar errors in the alternate content can be highlighted or distinguished from other content and common spell and grammar checking features can be used to fix or modify the errors, as with Ignore button 147 or Delete 148 button. Other features are possible. In addition, alternate content 146 in the spelling and grammar interface 144 can be visually distinguished or emphasized using, for example, font type or size, boldface, italics, underlining, foreground color, background color, or border style. Other forms of distinguishing or emphasizing the alternate content 146 are possible.

Figure 15:
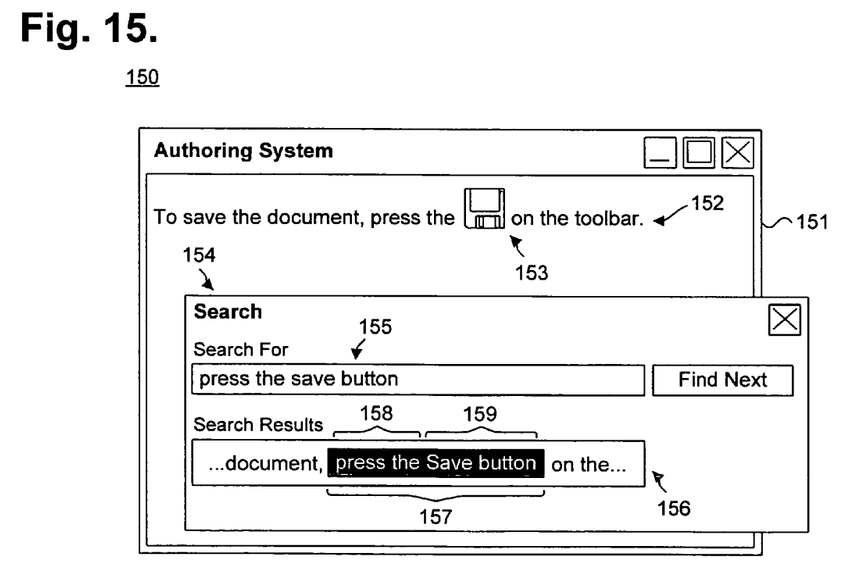
FIG. 15 is a screen shot showing, by way of example, an authoring environment providing a search authoring tool for use with alternate content, in accordance with a further embodiment.

FIG. 15 is a screen shot 150 showing, by way of example, an authoring environment 151 providing a search authoring tool 154 for use with alternate content, in accordance with a further embodiment. A document excerpt 152 includes a non-textual object 153, such as an icon of a diskette. A search interface 154 includes an input area 155 for entering a search criteria that can be used to search both textual content and alternate content for non-textual objects in the document excerpt 152. A display area 156 includes search results that include the textual content or alternate content for non-textual objects that match the search criteria. The search results are contextually co-located with proximately-located content in the document 152. A "Find Next" button allows the user to locate the next instance of matching textual content or alternate content for non-textual objects in the document excerpt 152. In this example, data 157 matching the search criteria 155 spans both textual content 158 and alternate content 159 for the non-textual object 153 in the document 152. The textual content 158 and alternate content 159 can be visually distinguished or emphasized using, for example, font type or size, boldface, italics, underlining, foreground color, background color, or border style. Other forms of emphasis are possible.

Logical Versus Physical Placement of a Non-Textual Object

Figure 16:
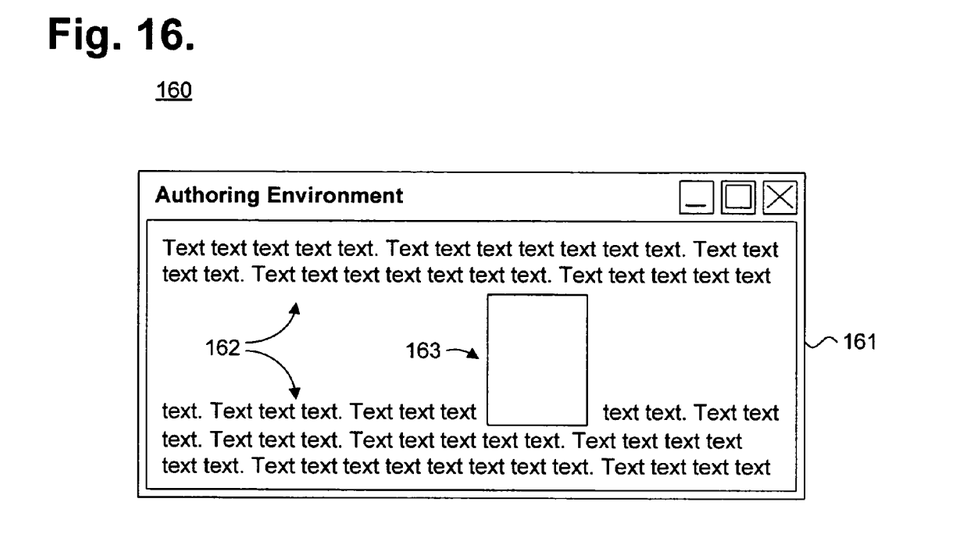
FIG. 16 is a screen shot showing, by way of example, an authoring environment with a physical view of non-textual object placement.

FIG. 16 is a screen shot 160 showing, by way of example, an authoring environment 161 containing a document excerpt 162 that contains a non-textual object 163. No formatting is applied to the non-textual object 163 and the physical placement of the non-textual object 163 within the document is the same as the logical placement.

Figure 17:
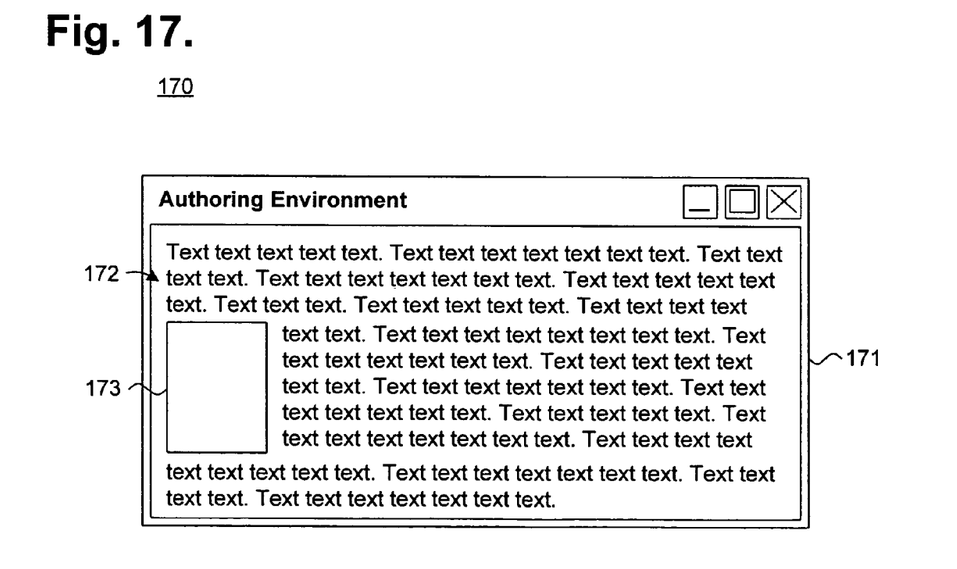
FIG. 17 is a screen shot showing, by way of example, an authoring environment with a logical view of non-textual object placement.

FIG. 17 is a screen shot 170 showing, by way of example, an authoring environment 171 offering a view of non-textual object placement in which the physical placement of the non-textual object differs from the logical placement when formatting is applied.

The authoring environment 171 shows text 172 and a non-textual object 173. The non-textual object 173 is formatted to "float," thereby allowing the text 172 to wrap around the non-textual object 173. In one embodiment, formatting instructions, such as Cascading Styles Sheets (CSS), are used to float the non-textual object 173. A CSS rule, such as "img {float: left}," is applied to the non-textual object 173, which floats the non-textual object to the left of the displayed page and causes the text 172 to wrap around. Other formatting instructions are possible.

As a result of formatting instructions, such as "float," the logical placement of a non-textual object within a document that is formatted can differ from its physical placement. However, the physical view, and not logical view, is processed by applications, such as assistive technologies that are unable to display or process non-textual objects. As a result, alternate content that is authored without consideration for the physical placement of a non-textual object might not provide contextually appropriate alternate content when used in lieu of a non-textual object.

Figure 18:
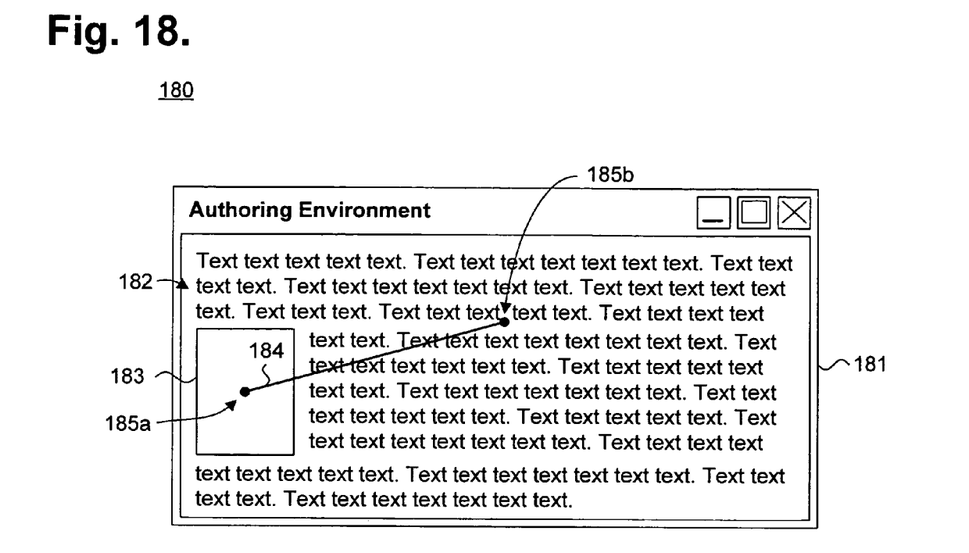
FIG. 18 is a screen shot showing, by way of example, the relationship between logical and physical placements of a non-textual object, in accordance with a further embodiment.

FIG. 18 is a screen shot 180 showing, by way of example, the relationship between logical and physical placements of a non-textual object, in accordance with a further embodiment. An authoring environment 181 shows text 182 and a non-textual object 183. The non-textual object 183 is formatted to "float" to the left of the displayed page, thereby causing the text 182 to wrap around the non-textual object. To indicate the physical location of the non-textual object 183 to the content author, a line 184 or other visual indicator can be displayed to show the relationship between the logical and physical placements of the non-textual object 183. Thus, the logical placement of the textual object 183 is indicated at one end 185A of the line 184, while the physical placement is indicated at the other end 185B of the line 184. The logical and physical placements of a single, selected, or all non-textual objects in a document can be displayed. The line 184 can be enabled or disabled by interface controls, including mouse-over, drag and drop, and user instructions, for instance, toolbar button, keystroke, or keystroke combination, operations. Other operations are possible. As well, the relationship represented by the line 184 can be expressed in other ways, including the use of markers or placeholder symbols at the points of logical and physical placement of non-textual objects.

In-Context Authoring of Alternate Content

Figure 19:
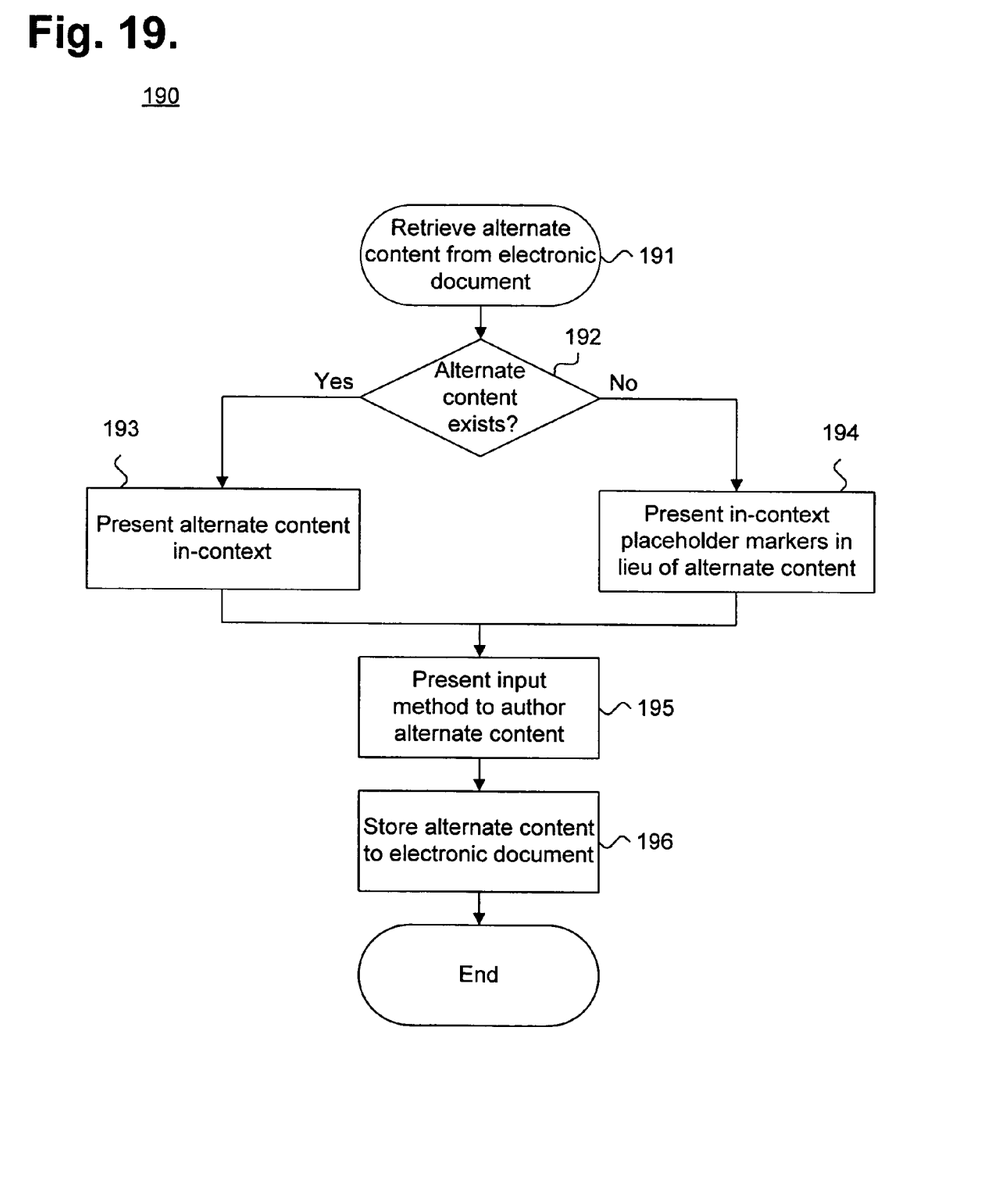
FIG. 19 is a flow diagram showing a routine for enabling in-context authoring of alternate content for non-textual objects, in accordance with one embodiment.

FIG. 19 is a flow diagram 190 showing a routine for enabling in-context authoring of alternate content for non-textual objects, in accordance with one embodiment. The routine can be executed, for instance, by an authoring environment 12 (shown in FIG. 1).

Initially, the authoring environment attempts to retrieve alternate content for one or more non-textual objects from one or more documents or from metadata for one or more documents (block 191). When alternate content for a non-textual object is available (block 192), the retrieved alternate content is presented with at least part of the content that is located proximate to the physical placement of the non-textual object in the document (block 193). When alternate content is not retrieved, a placeholder, or a blank space, marker, text message, icon, or combination of the foregoing items, is presented in lieu of alternate content with at least part of the content that is located proximate to the physical placement of the non-textual object in the document (block 194). An input method for authoring alternate content is then presented (block 195). Finally, the authoring environment stores the alternate content to one or more documents or to metadata for the one or more documents (block 196).

While the invention has been particularly shown and described as referenced to the embodiments thereof, those skilled in the art will understand that the foregoing and other changes in form and detail may be made therein without departing from the spirit and scope of the invention.

The invention claimed is:

1. A system for enabling in-context authoring of substitute content for one or more non-textual objects, comprising:
   a memory to access an electronic document comprising content data that includes sentences and at least one non-textual object contextually placed in a first position within the sentences; and
   an authoring environment that facilitates in-context editing of substitute content corresponding to the at least one non-textual object, comprising:
      an interactive output interface that presents the substitute content positioned in the first position within the sentences and presents at least a portion of the sentences positioned adjacent to the first position to enable a user to contextually review the substitute content with respect to the sentences; and
      an interactive input interface that enables a user to edit the substitute content positioned within the first position in response to editing commands and enables the user to store the substitute content to the electronic document.

2. A system according to claim 1, wherein the authoring environment comprising at least one of a visual interface and a non-visual interface that is selected from the group comprising an audio interface, tactile interface, and programmatic application programming interface.

3. A system according to claim 1, wherein the adjacent sentence portions comprises at least one of a sentence portion positioned immediately preceding and a sentence portion immediately following the physical placement of the non-textual object in the first position.

4. A system according to claim 1, wherein the electronic document is in a format selected from the group comprising HTML, XHTML, XML, OpenDocument, Word file format, and PDF.

5. A system according to claim 1, wherein the non-textual object is selected from the group comprising graphics, images, icons, controls, applications, audio output, video output, tactile output, MathML, SMIL and subdocuments.

6. A system according to claim 1, wherein at least one item selected from the group comprising a blank space, marker, text message and icon is presented in lieu of the adjacent sentence portions if the adjacent sentence portions for the at least one non-textual object are unavailable.

7. A system according to claim 1, wherein at least one item selected from the group comprising a blank space, marker, text message and icon is presented in lieu of the substitute content if the substitute content for the at least one non-textual object is unavailable.

8. A system according to claim 1, wherein the electronic document is written in a document language, further comprising:
an interface to limit the editing operations performed on the substitute content to only operations that are in compliance with the document language for substitute content.

9. A system according to claim 1, further comprising:
an interface to delimit the substitute content using emphasis selected from the group comprising plain text, background color, background pattern, foreground color, foreground pattern, font type, font size, border, outline, graphical markers, images, audio signals, tactile signals, and programmatic objects.

10. A method for enabling in-context authoring of substitute content for one or more non-textual objects, comprising:
accessing an electronic document including content data that includes sentences and at least one non-textual object contextually placed in a first position within the sentences; and
presenting substitute content positioned in the first position within the sentences, wherein the substitute content corresponds to the at least one non-textual object;
presenting at least a portion of the sentences positioned adjacent to the first position to enable a user to contextually review the substitute content with respect to the sentences;
editing the substitute content positioned in the first position within the sentences and in response to editing commands; and
storing the substitute content in the electronic document.

11. A method according to claim 10, further comprising:
providing an authoring environment comprising at least one of a visual interface and a non-visual interface that is selected from the group comprising an audio interface, tactile interface, and programmatic application programming interface.

12. A method according to claim 10, wherein the adjacent sentence portions comprises at least one of a sentence portion positioned immediately preceding and a sentence portion immediately following the physical placement of the non-textual object in the first position.

13. A method according to claim 10, wherein the electronic document is in a format selected from the group comprising HTML, XHTML, XML, OpenDocument, Word file format, and PDF.

14. A method according to claim 10, wherein the non-textual object is selected from the group comprising graphics, images, icons, controls, applications, audio output, video output, tactile output, MathML, SMIL and subdocuments.

15. A method according to claim 10, further comprising:
presenting at least one item selected from the group comprising a blank space, marker, text message and icon in lieu of the adjacent sentence portions if the adjacent sentence portions for the at least one non-textual object are unavailable.

16. A method according to claim 10, further comprising:
presenting at least one item selected from the group comprising a blank space, marker, text message and icon in lieu of the substitute content if the substitute content for the at least one non-textual object is unavailable.

17. A method according to claim 10, wherein the electronic document is written in a document language, further comprising:
limiting the editing operations performed on the substitute content to only operations that are in compliance with the document language for substitute content.

18. A method according to claim 10, further comprising:
delimiting the substitute content using emphasis selected from the group comprising plain text, background color, background pattern, foreground color, foreground pattern, font type, font size, border, outline, graphical markers, images, audio signals, tactile signals, and programmatic objects.

19. A computer-readable storage medium holding code for preforming the method according to claim 10.

20. A system for enabling in-context authoring of substitute content for one or more non-textual objects, comprising:
a memory to access an electronic document comprising content data; and
an in-context editor to facilitate in-context editing of substitute content corresponding to a non-textual object, comprising:
an interactive input device to select a segment of at least part of the content data, to obtain the non-textual object from a data source and to associate the non-textual object with the content data segment; and
an interactive output device to substitute the non-textual object for the content data segment and store the content data segment as the substitute content for the non-textual object.

21. A system according to claim 20, further comprising:
an authoring environment comprising at least one of a visual interface and a non-visual interface that is selected from the group comprising an audio interface, tactile interface, and programmatic application programming interface.

22. A system according to claim 20, wherein the electronic document is in a format selected from the group comprising HTML, XHTML, XML, OpenDocument, Word file format, and PDF.

23. A system according to claim 20, wherein the non-textual object is selected from the group comprising graphics, images, icons, controls, applications, audio output, video output, tactile output, MathML, SMIL and subdocuments.

24. A method for enabling in-context authoring of alternate substitute content for one or more non-textual objects, comprising:
accessing an electronic document comprising content data; and
facilitating in-context editing of substitute content corresponding to a non-textual object, comprising:
selecting a segment of at least part of the content data;
selecting one non-textual object from a plurality of non-textual objects contained within a data source;
associating the selected non-textual object with the content data segment;
substituting the non-textual object for the content data segment; and
storing the content data segment as the substitute content for the non-textual object.

25. A method according to claim 24, further comprising:
providing an authoring environment comprising at least one of a visual interface and a non-visual interface that is selected from the group comprising an audio interface, tactile interface, and programmatic application programming interface.

26. A method according to claim 24, wherein the electronic document is in a format selected from the group comprising HTML, XHTML, XML, OpenDocument, Word file format, and PDF.

27. A method according to claim 24, wherein the non-textual object is selected from the group comprising graphics, images, icons, controls, applications, audio output, video output, tactile output, MathML, SMIL and subdocuments.

28. A computer-readable storage medium holding code for preforming the method according to claim 24.

* * * * *